(12) United States Patent
Li et al.

(10) Patent No.: US 10,652,450 B2
(45) Date of Patent: May 12, 2020

(54) FOCUSING PROCESSING METHOD AND APPARATUS, AND TERMINAL DEVICE

(71) Applicant: GUANGDONG OPPO MOBILE TELECOMMUNICATIONS CORP., LTD., Dongguan (CN)

(72) Inventors: Xiaopeng Li, Dongguan (CN); Gong Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 45 days.

(21) Appl. No.: 15/616,047

(22) Filed: Jun. 7, 2017

(65) Prior Publication Data
US 2018/0152616 A1  May 31, 2018

(30) Foreign Application Priority Data
Nov. 29, 2016 (CN) .......................... 2016 1 1078877

(51) Int. Cl.
*H04N 5/232* (2006.01)
*H04N 5/369* (2011.01)
(Continued)

(52) U.S. Cl.
CPC ......... *H04N 5/23212* (2013.01); *G02B 5/201* (2013.01); *G02B 7/38* (2013.01);
(Continued)

(58) Field of Classification Search
CPC .......... G02B 5/201; G02B 7/38; G02B 13/36; G04N 5/3696; G04N 5/2258; G04N 5/247; G04N 5/23212
See application file for complete search history.

(56) References Cited

U.S. PATENT DOCUMENTS

2012/0147150 A1   6/2012  Kojima et al.
2012/0327195 A1   12/2012 Cheng
(Continued)

FOREIGN PATENT DOCUMENTS

CN   102025903 A   4/2011
CN   103246130 A   8/2013
(Continued)

OTHER PUBLICATIONS

European Patent Application No. 17176325.3 extended Search and Opinion dated Dec. 7, 2017, 10 pages.
(Continued)

*Primary Examiner* — Ruiping Li
(74) *Attorney, Agent, or Firm* — Lathrop GPM LLP

(57) ABSTRACT

Embodiments of the present invention provide a focusing processing method and apparatus, and a terminal device. The method includes: obtaining a first image collected by n/2 pixel points on a left side of a combination pixel in the second image sensor and a second image collected by n/2 pixel points on a right side of the combination pixel in the second image sensor; determining a phase difference between the first image and the second image and determining whether the phase difference is in a preset range; and controlling a first motor in the first camera assembly to drive a first camera to move according to the phase difference and depending on a preset strategy, if the phase difference is not in the preset range.

18 Claims, 4 Drawing Sheets

(51) Int. Cl.

| | | |
|---|---|---|
| *H04N 5/247* | (2006.01) | |
| *H04N 5/225* | (2006.01) | |
| *G02B 5/20* | (2006.01) | |
| *G02B 7/38* | (2006.01) | |
| *G03B 13/36* | (2006.01) | |

(52) U.S. Cl.
CPC .......... *G03B 13/36* (2013.01); *H04N 5/2258* (2013.01); *H04N 5/247* (2013.01); *H04N 5/3696* (2013.01)

(56) References Cited

U.S. PATENT DOCUMENTS

| | | |
|---|---|---|
| 2014/0022636 A1 | 1/2014 | Asano |
| 2017/0118396 A1* | 4/2017 | Ohnishi |

FOREIGN PATENT DOCUMENTS

| | | |
|---|---|---|
| CN | 105007425 A | 10/2015 |
| CN | 105338263 A | 2/2016 |
| CN | 105376474 A | 3/2016 |
| CN | 105530421 A | 4/2016 |
| CN | 106210548 A | 12/2016 |
| CN | 106791373 A | 5/2017 |
| JP | 2005260885 A | 9/2005 |
| JP | 2015102735 A | 6/2015 |

OTHER PUBLICATIONS

PCT/CN2017/090640 English translation of International Search Report and Written Opinion dated Sep. 30, 2017, 12 pages.
Chinese Patent Application No. 201611078877.8 English translation of Office Action dated Mar. 5, 2019, 22 pages.
Chinese Patent Application No. 201611078877.8 Office Action dated Mar. 5, 2019, 11 pages.

* cited by examiner

FOCUSING PROCESSING METHOD AND APPARATUS, AND TERMINAL DEVICE

CROSS-REFERENCE TO RELATED APPLICATIONS

This application is based on and claims priority of Chinese Patent Application No. 201611078877.8, filed on Nov. 29, 2016.

TECHNICAL FIELD

The present disclosure generally relates to a photography field, and more particularly, to a focusing processing method and apparatus, and a terminal device.

BACKGROUND

With development of the smart phone, there is an increasing requirement for camera function, particularly for the quick focusing function, of the smart phone, this is because a clear scene can be snapshot quickly only after a quick focusing.

Nowadays, a typical quick focusing processing method is a way of Dual pixel CMOS (Complementary Metal-Oxide-Semiconductor Transistor) AF (Automatic Focusing), and each pixel on an image sensor corresponds to the same micro lens and is provided with two photodiodes. When an automatic focusing is performed, each pixel may obtain two signals (image A and image B) via the two photodiodes at one time. The driving amplitude and driving direction may be calculated by computing the parallax signal between image A and image B, and then the camera is driven to performing focusing operation.

However, in the above way of Dual Pixel CMOS AF, a photosensitive element in the image sensor is required to have a large area, which needs to reach 1/2.5 inch, and thus the size of the pixel should be 1.44 μm. In this way, it is required to increase the height of the camera assembly, such that the difficulty of structural design and installation in the phone is increased and the number of pixels is decreased sharply. Moreover, the increasing of area of the photosensitive element and pixel area causes an increment in cost of the camera assembly.

SUMMARY

Embodiments of the present disclosure seek to solve at least one of the problems existing in the related art to at least some extent.

Accordingly, a first objective of the present disclosure is to provide a focusing processing method. By performing a phase focusing using a second camera assembly including a large area of combination pixels, the accuracy and speed of focusing are improved, the cost of quick focusing is reduced and quality of the image photographed by a terminal device is improved.

The second objective of the present disclosure is to provide a focusing processing apparatus.

The third objective of the present disclosure is to provide a terminal device.

In order to achieve the above objectives, a first aspect of the present disclosure provides a focusing processing method. The method is applied in a terminal device provided with a first camera assembly and a second camera assembly, in which each filter unit in the first camera assembly corresponds to a pixel point in a first image sensor, each filter unit in the second camera assembly corresponds to a combination pixel in a second image sensor, and each combination pixel includes n adjacent pixel points, where n is an even number greater than or equal to 2; and the method includes: obtaining a first image collected by n/2 pixel points on a left side of a combination pixel in the second image sensor and a second image collected by n/2 pixel points on a right side of the combination pixel in the second image sensor; determining a phase difference between the first image and the second image and determining whether the phase difference is in a preset range; and controlling a first motor in the first camera assembly to drive a first camera to move according to the phase difference and depending on a preset strategy, if the phase difference is not in the preset range.

In order to achieve the above objectives, a second aspect of the present disclosure provides a focusing processing apparatus. The apparatus is applied in a terminal device provided with a first camera assembly and a second camera assembly, in which each filter unit in the first camera assembly corresponds to a pixel point in a first image sensor, each filter unit in the second camera assembly corresponds to a combination pixel in a second image sensor, and each combination pixel comprises n adjacent pixel points, where n is an even number greater than or equal to 2; and the apparatus includes: a first obtaining module, configured to obtain a first image collected by n/2 pixel points on a left side of a combination pixel in the second image sensor and a second image collected by n/2 pixel points on a right side of the combination pixel in the second image sensor; a judging module, configured to determine a phase difference between the first image and the second image, and to determine whether the phase difference is in a preset range; and a first processing module, configured to control a first motor in the first camera assembly to drive a first camera to move according to the phase difference and depending on a preset strategy, if the phase difference is not in the preset range.

In order to achieve the above objectives, a third aspect of the present disclosure provides a terminal device, including a shell, a processor, a memory, a circuit board, a power supply circuit, a first camera assembly and a second camera assembly, in which each filter unit in the first camera assembly corresponds to a pixel point in a first image sensor, each filter unit in the second camera assembly corresponds to a combination pixel in a second image sensor, each combination pixel includes n adjacent pixel points, where n is an even number greater than or equal to 2; the circuit board is located in a space formed by the shell, the processor and the memory are arranged on the circuit board; the power supply circuit is configured to supply power for each circuit or component in the terminal device; the memory is configured to store executable program codes; the processor is configured to execute a program corresponding to the executable program codes by reading the executable program codes stored in the memory so as to perform following acts of: obtaining a first image collected by n/2 pixel points on a left side of a combination pixel in the second image sensor and a second image collected by n/2 pixel points on a right side of the combination pixel in the second image sensor; determining a phase difference between the first image and the second image and determining whether the phase difference is in a preset range; and controlling a first motor in the first camera assembly to drive a first camera to move according to the phase difference and depending on a preset strategy, if the phase difference is not in the preset range.

DETAILED DESCRIPTION

Figure 1:
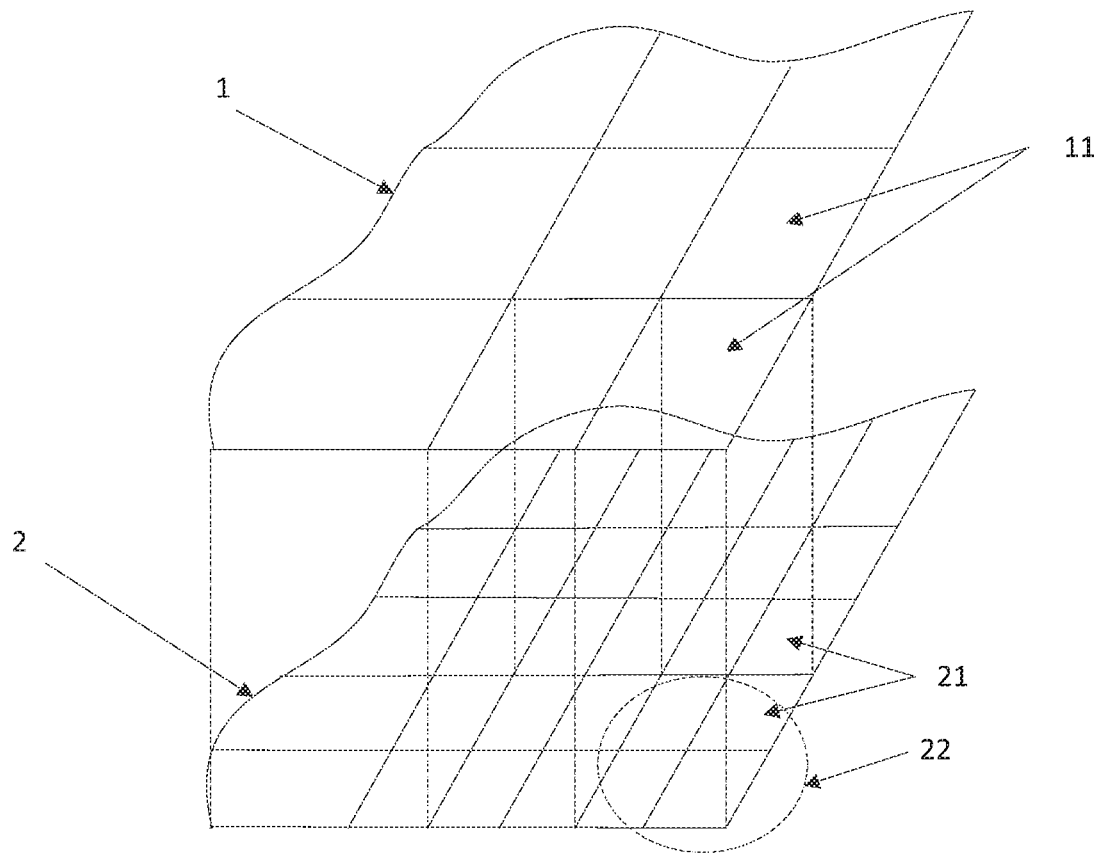
FIG. 1 is a block diagram of a second camera assembly according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

For solving the problem resulting from a focusing way realized by configuring two photodiodes for each pixel in the image sensor in the related art that the height of the camera assembly may be increased, the difficulty of structural design and installation in phones is increased and the number of pixels is decreased sharply, as well the cost of the camera assembly is increased due to the increment of area of the photosensitive element and pixel area, embodiments of the present disclosure provide a method and an apparatus employing two cameras, in which one of the two cameras is used for photographing pictures and the other one of the two cameras is used for performing a phase focusing with all pixels therein, such that the accuracy and speed of focusing and quality of photographed images may be improved with less cost.

The focusing processing method and apparatus, and the terminal device according to embodiments of the present disclosure will be described below with reference to drawings.

The focusing processing method according to embodiments of the present disclosure is applied in a terminal device provided with a first camera assembly and a second camera assembly. There are various kinds of terminal devices, such as a phone, an IPAD, a smart wearable device etc.

The first camera assembly may adopt a structure of a common camera assembly at present, i.e., the first camera assembly may include a first filter array, a first image sensor and a first motor. Each filter unit in the first filter array corresponds to one pixel point in a corresponding first image sensor. Each photosensitive pixel point in the first image sensor generates an electric signal according to a received optical signal filtered by each filter unit in the filter array and outputs an image through exposure.

In detail, the first image sensor may be a charge-coupled device (CCD) image sensor, or a complementary metal oxide semiconductor (CMOS) image sensor, which is not limited herein.

Additionally, the second camera assembly may have a same structure as the first camera assembly, but each filter unit in the second camera assembly corresponds to one combination pixel in a second image sensor. Each combination pixel includes n adjacent pixel points, where n is an even number greater than or equal to 2. In the following, the structure of a camera assembly in this embodiment will be described by taking the second camera assembly as an example and with reference to FIG. 1.

FIG. 1 is a block diagram of a second camera assembly according to an embodiment of the present disclosure.

As illustrated in FIG. 1, the second camera assembly includes a second filter array 1 and a second image sensor 2.

The second filter array 1 includes a plurality of filter units 11, and each filter unit 11 corresponds to n adjacent pixel points 21 in the second image sensor 2, where n is an even number greater than or equal to 2. In embodiments of the present disclosure, n may be 2, 4, 8 or another even number, while the imaging quality of the second image sensor 2 is optimum when n=4, such that FIG. 1 exemplarily illustrates n=2*2 pixel points. The second motor is configured to drive the second camera to rotate or move in plane, so as to realize the focusing.

From the structure as illustrated in FIG. 1, in the second camera assembly, each 2*2 pixel points in the second image sensor 2 are combined to form one combination pixel 22, and then a phase detection (i.e., PD) may be performed by means of the second camera assembly. In detail, the combination pixel 22 is divided into two parts: the left part and the right part. During the focusing, an image A is collected by pixel points in the left part of the combination pixel, and an image B is collected by pixel points in the right part of the combination pixel, then the first camera assembly and the second camera assembly are controlled to focus according to a phase difference between the two images.

In detail, the second image sensor may be a charge-coupled device (CCD) image sensor, or a complementary metal oxide semiconductor (CMOS) image sensor, which is not limited herein.

In a practical implementation, the pixels in the first camera assembly and the second camera assembly may be selected as needed. For example, each of the first camera assembly and the second camera assembly may be a camera with 16 million pixels, such that the second camera assembly would become a camera with 4 million pixels after pixel binning. In an embodiment, the first camera assembly may be a camera with 16 million pixels, and the second camera assembly may be a camera with 8 million pixels, which would become a camera with 2 million pixels after pixel binning, and the present disclosure is not limited thereto.

Generally, the bigger the combination pixel in the second camera assembly is, the more accurate and faster the phase focusing is. However, if the number of pixels in the camera assembly is big, the cost is high accordingly. Thus, the second camera assembly with appropriate pixels may be chosen according to the requirement of the terminal device on speed and accuracy of focusing and according to the cost control.

The principle of phase focusing will be described below with reference to FIG. 2.

Figure 2:
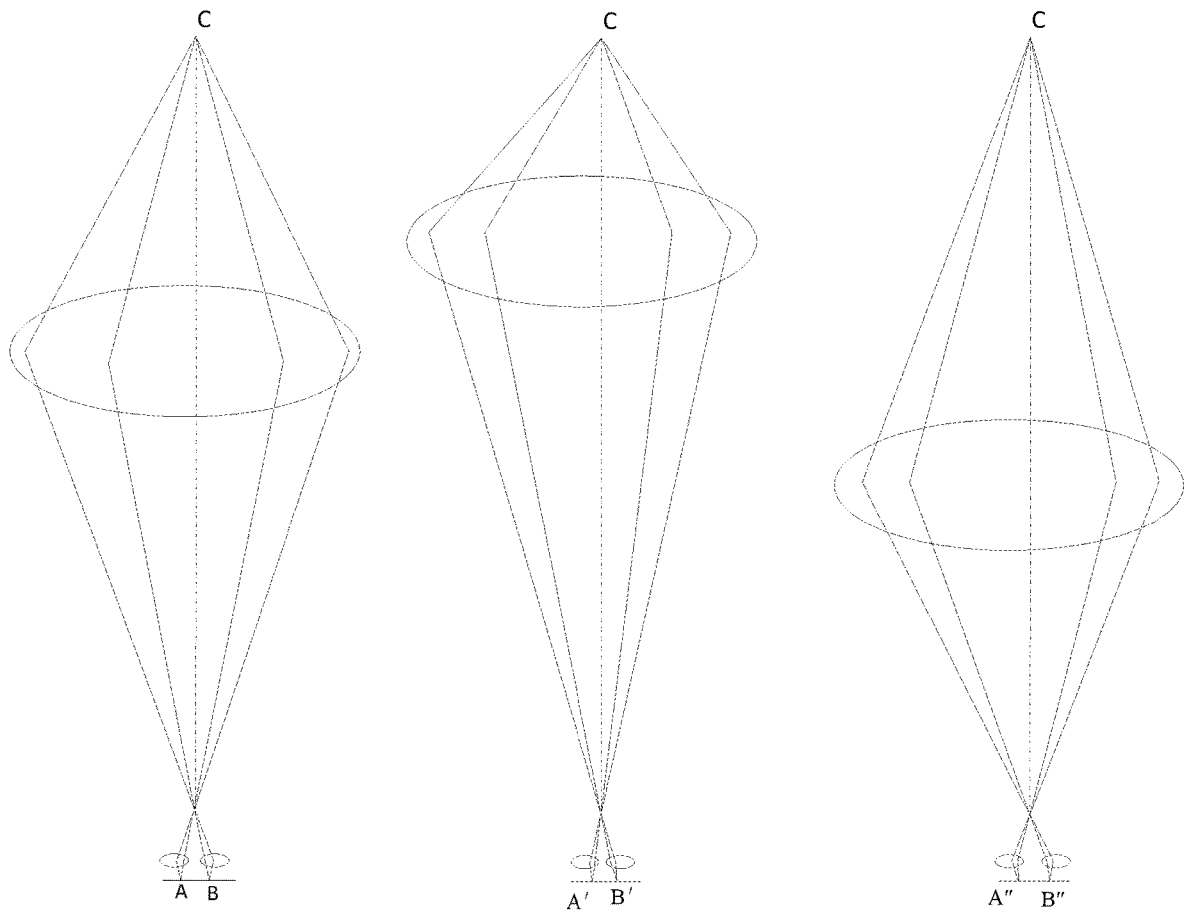
FIG. 2 is a schematic diagram showing a principle of phase focusing.

FIG. 2 is a schematic diagram of the principle of phase focusing. As illustrated in FIG. 2, during the phase focusing, after passing through the filter unit 11, light emitted from a photographed object C gathers in a light path and spreads, and then enters into the combination pixel 22. Spectroscopic lenses 41 and 42 in front of the combination pixel divide the light into two beams, such that an image A and an image B are generated in the combination pixel 22. A linear sensor in the second image sensor may detect a distance between the two images, i.e., the phase difference between the two images, and then the phase difference between the two images is compared with a standard phase difference of the second image sensor so as to determine whether the second image sensor is focused.

For example, assume that under the focused state, a phase difference between the image A and image B obtained by the left and right part of a combination pixel 22 is illustrated in FIG. 2a. When the phase difference between the image A' and image B' obtained by the left and right part of the combination pixel 22 is as illustrated in FIG. 2b or the phase difference between the image A" and image B" obtained by the left and right part of the combination pixel 22 is as illustrated in FIG. 2c, since the difference between the image A' and image B' is less than the difference between the image A and image B while the difference between the image A" and image B" is greater than the difference between the image A and the image B, it may be considered that the combination pixel 22 does not realize the focusing under the cases illustrated in FIGS. 2b and 2c, and then the camera may be driven to move according to a relationship between the difference under the focused state and the current phase difference between the two images, so as to realize the focusing.

In the second camera assembly, a plurality of pixel points are combined to form one combination pixel, and then the phase focusing is performed according to the combination pixel. The combination pixel has a high sensitivity due to a large area, such that a quick focusing may be realized even under low light.

Based on the above-mentioned structure of the second camera assembly and the first camera assembly, the focusing processing method according to embodiments of the present disclosure will be described with reference to FIG. 3.

Figure 3:
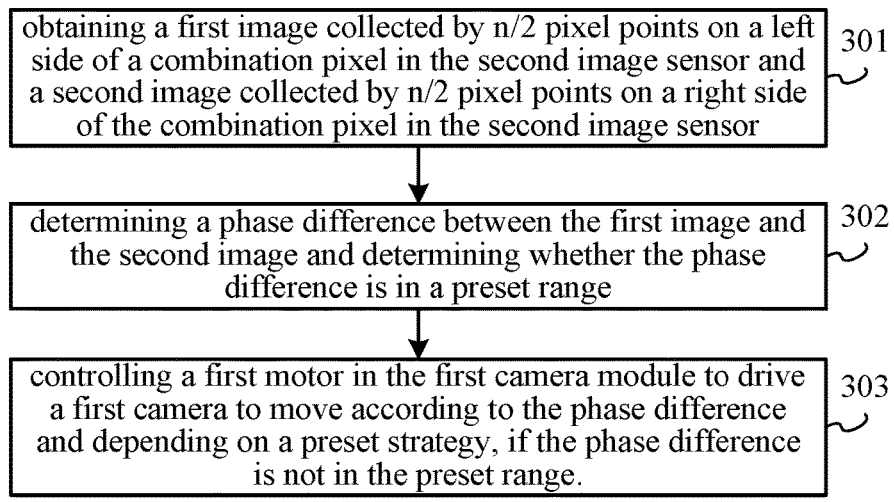
FIG. 3 is a flow chart of a focusing processing method according to an embodiment of the present disclosure.

FIG. 3 is a flow chart of a focusing processing method according to an embodiment of the present disclosure.

As illustrated in FIG. 3, the focusing processing method according to this embodiment includes following acts.

At block 301, a first image collected by n/2 pixel points on a left side of a combination pixel in a second image sensor and a second image collected by n/2 pixel points on a right side of the combination pixel in the second image sensor are obtained.

The terms "left" and "right" in this embodiment refer to that, a combination pixel is divided symmetrically into two parts.

For example, if a combination pixel corresponding to each filter unit includes 2*2 pixel points, as the structure of the second camera assembly illustrated in FIG. 1, then during the focusing, as illustrated in FIG. 1, an image A may be collected by the two pixel points on the left side of each combination pixel, and an image B may be collected by the two pixel points on the right side.

At block 302, a phase difference between the first image and the second image is determined, and it is determined whether the phase difference is in a preset range.

The preset range refers to a phase range determined according to a phase difference between images obtained by the left and right part of pixel points in the combination pixel 22 when the second image sensor is under a focused state and according to allowable error range.

For example, if the phase difference between the two images obtained by the combination pixel 22 is A when the second image sensor is under a focused state, and the allowable error range is b, then the preset range in this embodiment may be (A-b, A+b).

At block 303, if the phase difference is not in the preset range, a first motor in the first camera assembly is controlled to drive a first camera to move according to the phase difference and depending on a preset strategy.

The preset strategy refers to a map relationship between a movement distance of the camera and the phase difference between two images generated in a combination pixel determined according to photographic characteristics of the second camera assembly.

For example, if the second image sensor determines the phase difference between the first image and the second image as that illustrated in FIG. 2b, the camera is controlled to move towards the first image sensor so as to realize the focusing. If the second image sensor determines the phase difference between the first image and the second image as that illustrated in FIG. 2c, the camera is controlled to move away from the first image sensor so as to realize the focusing.

The above act 303 may include: controlling the first motor in the first camera assembly to drive the first camera to move towards the first image sensor depending on the preset strategy, if the phase difference is lower than the preset range; or controlling the first motor in the first camera assembly to drive the first camera to move away from the first image sensor depending on the preset strategy, if the phase difference is higher than the preset range.

In an embodiment of the present disclosure, if the phase difference between the first image and the second image is changed, the distance by which the camera is driven by the motor to move is changed. In detail, a mapping table between camera control information and the phase difference between the first image and the second image is set in advance, and the phase difference between the first image and the second image is determined, then the distance and direction to be moved may be determined by inquiring the preset mapping table, finally the camera is controlled to move the corresponding distance to realize the focusing.

In this embodiment, each combination pixel in the second camera assembly may be used for performing a phase correction so as to realize the focusing. If the second image sensor includes m pixel points (where m is an even number far greater than n), the above act 301 includes: obtaining m/n groups of images collected by the second image sensor, in which each group of images includes the first image collected by n/2 pixel points on a left side of a combination pixel and the second image collected by n/2 pixel points on a right side of the combination pixel. Accordingly, the above act 302 includes: determining a phase difference between the first image and the second image in each group of images, and determining whether the phase difference between the first image and the second image in each group of images is in the preset range.

For example, if the second camera assembly includes 8 million pixels, and each combination pixel includes 2*2 pixel points, then 2 million combination pixels may be obtained after pixel binning. Then, the second camera assembly with 2 million combination pixels is used for performing PD focusing.

In addition, in an embodiment, if it is determined that, not every phase difference between the first image and the second image in the obtained 200 groups of images is the same, then an average value of all the phase differences is calculated so as to control the camera according to the average value. In an embodiment of the present disclosure, when not every one of the phase differences is the same, firstly de-noising processing is performed on all the phase differences, i.e., the one which is obviously different from other phase differences is removed, and then an average value of the remaining phase differences is calculated so as to control the camera to move according to the average value for realizing focusing.

In an embodiment, since the area of a combination pixel in the second camera assembly covers n (where n is an even number greater than or equal to 2) pixel points, i.e., the area of a combination pixel is the area occupied by the n pixel points, the sensitivity and accuracy of phase focusing realized with the combination pixel may be ensured.

With the focusing processing method according to embodiments of the present disclosure, firstly two images collected by the combination pixel in the second camera assembly are obtained, and then it is determined whether the phase difference between the two images is in the preset range, if not, the first motor is controlled to drive the first camera to move according to the phase difference. In this way, by performing a phase focusing using the second camera assembly including a large area of combination pixels, the accuracy and speed of focusing are improved, the cost of quick focusing is reduced, and quality of the image photographed by the terminal device is improved.

In detail, from the above analysis, a quick and accurate focusing of the terminal device may be realized by using two camera assemblies. In an embodiment, provided that the focusing of the first camera assembly is realized by controlling the first camera assembly to move according to a phase difference between two images obtained by a combination pixel in the second camera assembly, it is required to ensure that the first camera assembly and the second camera assembly can realize the focusing synchronously. In the following, take a combination pixel including 2*2 pixel points in the second camera assembly as an example. The focusing processing method according to embodiments of the present disclosure will be further explained with reference to FIG. 4.

Figure 4:
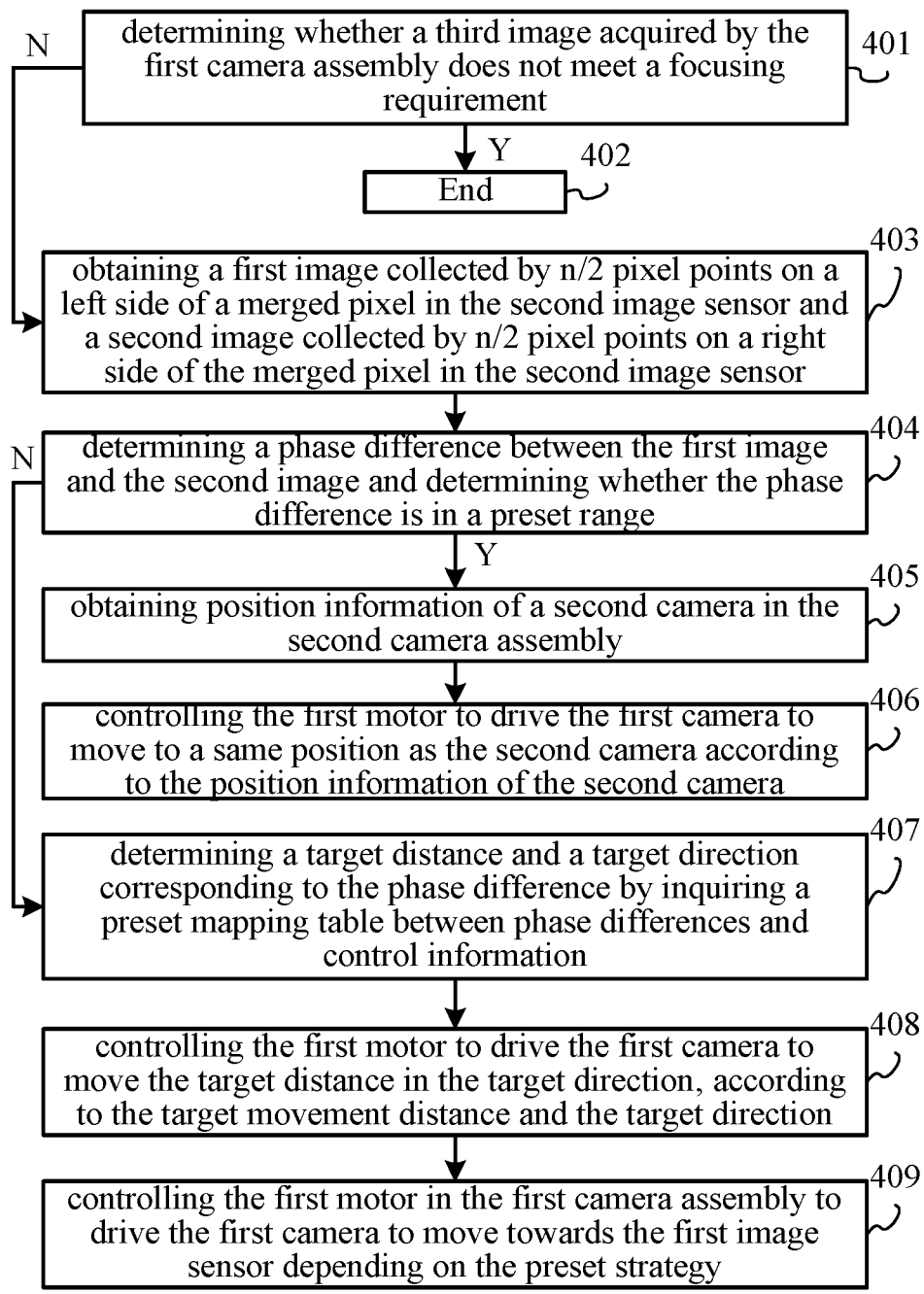
FIG. 4 is a flow chart of a focusing processing method according to an embodiment of the present disclosure.

FIG. 4 is a flow chart of a focusing processing method according to another embodiment of the present disclosure.

As illustrated in FIG. 4, the method includes following acts.

At block 401, it is determined whether a third image obtained by the first camera assembly meets a focusing requirement, if yes, act 402 is executed, and otherwise act 403 is executed.

At block 402, the procedure is finished.

At block 403, a first image collected by two pixel points on the left side of a combination pixel in the second image sensor is obtained, and a second image collected by two pixel points on the right side of the combination pixel is obtained.

At block 404, a phase difference between the first image and the second image is determined, and it is determined whether the phase difference is in a preset range, it yes act 405 is executed, and otherwise act 407 is executed.

At block 405, position information of the second camera in the second camera assembly is obtained.

The position information of the second camera may refer to a distance of the second camera relative to the image sensor or relative to the filter array, which is not limited herein.

In detail, since the position of the camera is related to the phase difference between the first image and the second image obtained by a combination pixel, the position of the second camera in the second camera assembly may be determined according to the phase difference between the first image and the second image obtained by the combination pixel.

At block 406, the first motor is controlled to drive the first camera to move to the same position as the second camera according to the position information of the second camera.

In a practical implementation, if the phase difference between the first image and the second image obtained by the combination pixel in the second camera assembly is in the preset range, it indicates that the second camera assembly has realized the focusing, i.e., under the current photographing scene, a distance of the second camera from the photographed object meets a focusing requirement, such that the first camera may be controlled to move to the same position as the second camera so as to realize the focusing of the first camera.

At block 407, a target distance and a target direction corresponding to the phase difference are determined by inquiring a preset mapping table between phase differences and control information.

At block 408, the second motor in the second camera assembly is controlled to drive the second camera to move the target distance in the target direction, according to the target distance and the target direction.

At block 409, the first motor is controlled to drive the first camera to move the target distance in the target direction, according to the target distance and the target direction.

In detail, if the phase difference between the first image and the second image obtained by the combination pixel is not in the preset range, it may be determined that the second camera and the first camera are not in the focusing position, and then the target direction and the target distance may be determined by inquiring the preset mapping table, and the first camera and the second camera are controlled to move to the focusing position to realize the focusing.

In an embodiment, after determining the target distance and the target direction, the first camera may be controlled to move firstly, or the second camera may be controlled to move firstly, or the first camera and the second camera are controlled to move at the same time, which is not limited herein.

Further, after the first camera and the second camera are controlled to realize the focusing, the first camera assembly and the second camera assembly are controlled to obtain an image of the currently photographed object. In an embodiment, the image of the currently photographed object may be obtained by only using the first camera assembly, or images of the currently photographed object under different light sensation may be obtained by using both the first camera assembly and the second camera assembly and then the two images are composited to obtain a high dynamic range image, such that the quality of the image photographed by the terminal device may be improved.

In an embodiment, since the quick focusing is realized by using two camera assemblies in the present disclosure and the two camera assemblies may be disposed separately in the terminal device, the terminal device may realize the quick focusing without increasing the height, thereby providing a condition for thinning the terminal device down.

With the focusing processing method according to embodiments of the present disclosure, when it is determined that the first camera assembly is not in the focusing state, two images are obtained by the combination pixel in the second camera assembly, and then it is determined whether the phase difference between the two images is in the preset range, if yes, the position of the first camera is adjusted according to the position of the second camera, if not, the target distance and the target direction are determined according to a preset mapping relationship between phase differences and control information, and the first camera and the second camera are controlled to move the target distance in the target direction respectively to realize the focusing. In this way, by performing a phase focusing using the second camera assembly including a large area of combination pixel, the accuracy and speed of focusing are improved, the cost of quick focusing is reduced, and quality of the image photographed by the terminal device is improved.

Figure 5:
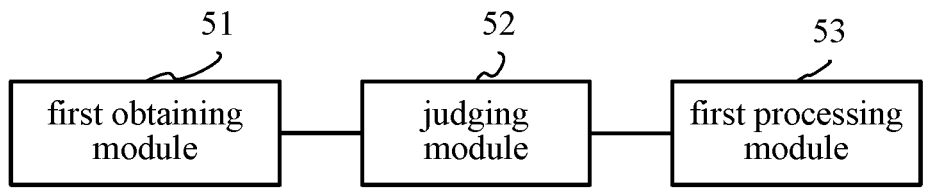
FIG. 5 is a block diagram of a focusing processing apparatus according to an embodiment of the present disclosure.

FIG. 5 is a block diagram of a focusing processing apparatus according to an embodiment of the present disclosure.

In detail, the focusing processing apparatus according to the embodiment of the present disclosure is applied in a terminal device provided with a first camera assembly and a second camera assembly. Each filter unit in the first camera assembly corresponds to one pixel point in a first image sensor, and each filter unit in the second camera assembly corresponds to one combination pixel in a second image sensor. Each combination pixel includes n adjacent pixel points, where n is an even number greater than or equal to 2.

Accordingly, as illustrated in FIG. 5, the focusing processing apparatus includes a first obtaining module 51, a judging module 52 and a first processing module 53.

The first obtaining module 51 is configured to obtain a first image collected by n/2 pixel points on a left side of a combination pixel in the second image sensor and a second image collected by n/2 pixel points on a right side of the combination pixel in the second image sensor.

The judging module 52 is configured to determine a phase difference between the first image and the second image, and to determine whether the phase difference is in a preset range.

The first processing module 53 is configured to control a first motor in the first camera assembly to drive a first camera to move according to the phase difference and depending on a preset strategy, if the phase difference is not in the preset range.

In a practical implementation, if the second image sensor includes m pixel points, where m is an even number far greater than n, the first obtaining module 51 is configured to: obtain m/n groups of images collected by the second image sensor, in which each group of images includes the first image collected by n/2 pixel points on a left side of a combination pixel and the second image collected by n/2 pixel points on a right side of the combination pixel. Accordingly, the judging module is configured to determine a phase difference between the first image and the second image in each group of images, and determine whether the phase difference between the first image and the second image in each group of images is in the preset range.

Further, the first processing module 53 is configured to determine a target distance and a target direction corresponding to the phase difference by inquiring a preset mapping table between phase differences and control information, and control the first motor to drive the first camera to move the target distance in the target direction, according to the target distance and the target direction.

In detail, the first processing module 53 is configured to control the first motor in the first camera assembly to drive the first camera to move towards the first image sensor depending on the preset strategy, if the phase difference is lower than the preset range; or control the first motor in the first camera assembly to drive the first camera to move away from the first image sensor depending on the preset strategy, if the phase difference is higher than the preset range.

In a implementation of the embodiments, each filter unit in the second camera assembly corresponds to 2*2 pixel points in the second image sensor.

It should be noted that, the above explanation of the focusing processing method embodiments is also suitable for the focusing processing apparatus of this embodiment, which is not described again.

With the focusing processing apparatus according to embodiments of the present disclosure, firstly two images collected by combination pixels in the second camera assembly are obtained, and then it is determined whether the phase difference between the two images is in the preset range, if not, the first motor is controlled according to the phase difference to drive the first camera to move. In this way, by performing a phase focusing using the second camera assembly including a large area of combination pixels, the accuracy and speed of focusing are improved, the cost of quick focusing is reduced, and quality of the image photographed by the terminal device is improved.

Figure 6:
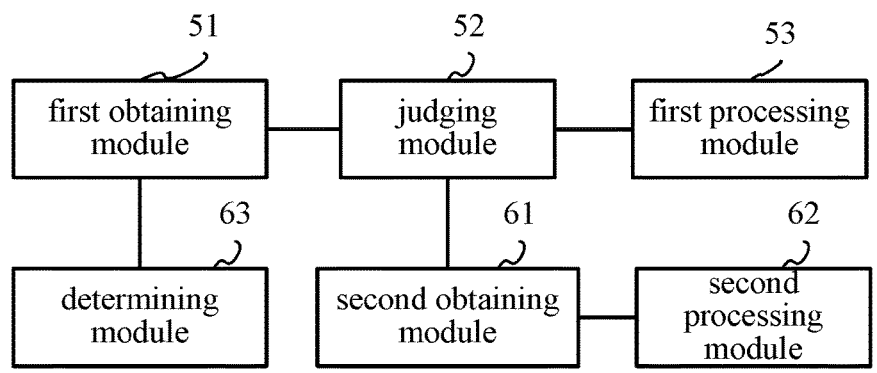
FIG. 6 is a block diagram of a focusing processing apparatus according to another embodiment of the present disclosure.

FIG. 6 is a block diagram of a focusing processing apparatus according to another embodiment of the present disclosure.

As illustrated in FIG. 6, based on FIG. 5, the focusing processing apparatus according to this embodiment further includes a second obtaining module 61 and a second processing module 62.

The second obtaining module 61 is configured to obtain position information of a second camera in the second camera assembly, if the phase difference is in the preset range.

The second processing module 62 is configured to control the first motor to drive the first camera to move to a same position as the second camera according to the position information of the second camera.

Further, for ensuring the synchronization of the first camera and the second camera, in an implementation of the embodiment, if the phase difference between the first image and the second image is not in the preset range, the first processing module 53 is further configured to control the second motor in the second camera assembly to drive the second camera to move according to the phase difference.

Moreover, before obtaining two images collected by a combination pixel in the second camera assembly, it may be determined whether the first camera assembly realizes the focusing, i.e., the focusing processing apparatus further includes a determining module 63 configured to determine that a third image acquired by the first camera assembly does not meet a focusing requirement.

It should be noted that, the above explanation of the focusing processing method embodiments is also suitable for the focusing processing apparatus of this embodiment, which is not described again.

With the focusing processing apparatus according to embodiments of the present disclosure, when determining that the first camera assembly is not in the focusing state, two images are obtained by combination pixels in the second camera assembly, and then it is determined whether the phase difference between the two images is in the preset range, if yes, the position of the first camera is adjusted according to the position of the second camera, if not, the target distance and the target direction are determined according to a preset mapping relationship between phase differences and control information, and the first camera and the second camera are controlled to move the target distance in the target direction respectively to realize the focusing. In this way, by performing a phase focusing using the second camera assembly including a large area of combination pixels, the accuracy and speed of focusing are improved, the cost of quick focusing is reduced, and quality of the image photographed by the terminal device is improved.

Based on the focusing processing apparatus according to the above embodiments, another aspect of the present disclosure further provides a terminal device.

Figure 7:
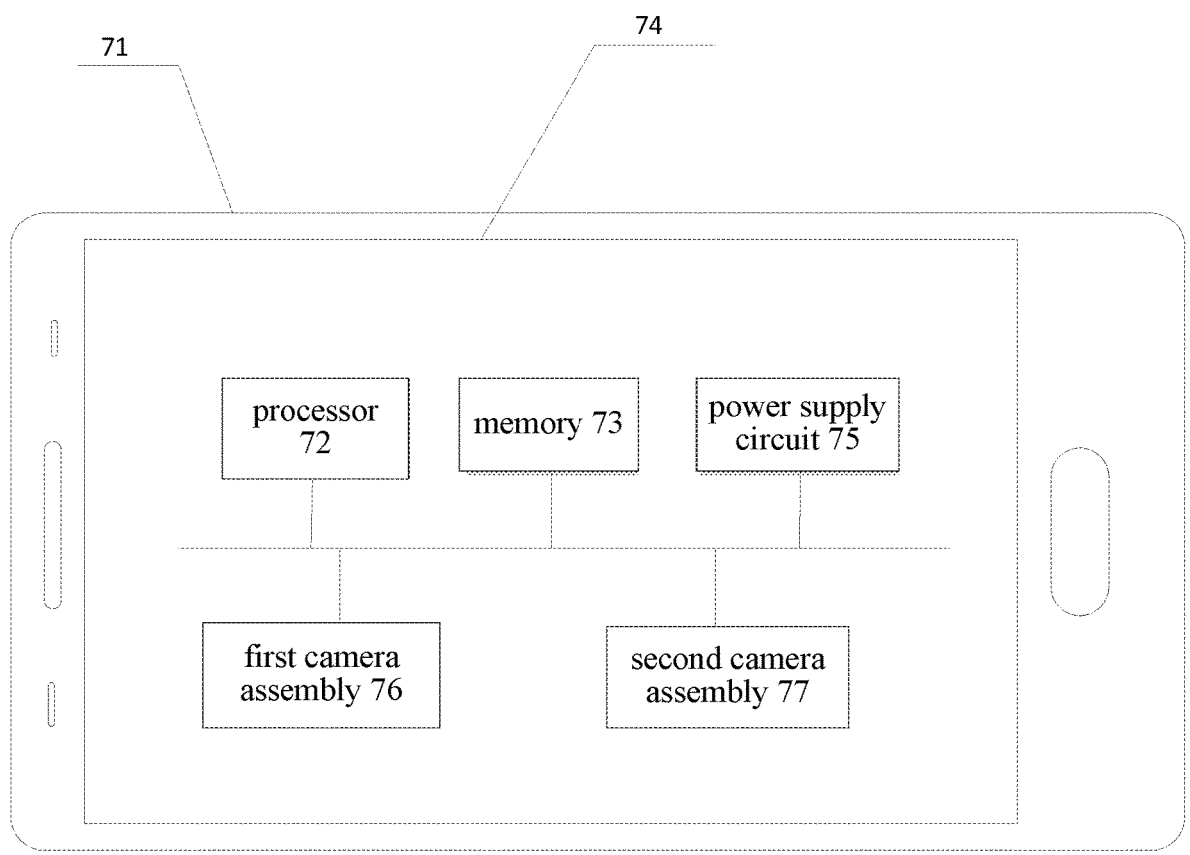
FIG. 7 is a block diagram of a terminal device according to an embodiment of the present disclosure.

FIG. 7 is a block diagram of a terminal device according to an embodiment of the present disclosure.

As illustrated in FIG. 7, the terminal device according to embodiment of the present disclosure includes a shell 71, a processor 72, a memory 73, a circuit board 74, a power supply circuit 75, a first camera assembly 76 and a second camera assembly 77, wherein each filter unit in the first camera assembly 76 corresponds to one pixel point in a first image sensor, each filter unit in the second camera assembly 77 corresponds to one combination pixel in a second image sensor, each combination pixel comprises n adjacent pixel points, where n is an even number greater than or equal to 2; the circuit board 74 is located in a space formed by the shell 71, the processor 72 and the memory 73 are arranged on the circuit board 74; the power supply circuit 75 is configured to supply power for each circuit or component in the terminal device; the memory 73 is configured to store executable program codes; the processor 72 is configured to execute a program corresponding to the executable program codes by reading the executable program codes stored in the memory 73 so as to perform following acts of:

obtaining a first image collected by n/2 pixel points on a left side of a combination pixel in the second image sensor and a second image collected by n/2 pixel points on a right side of the combination pixel in the second image sensor;

determining a phase difference between the first image and the second image and determining whether the phase difference is in a preset range; and controlling a first motor in the first camera assembly to drive a first camera to move according to the phase difference and depending on a preset strategy, if the phase difference is not in the preset range.

It should be noted that, the above explanation of the focusing processing apparatus embodiments is also suitable for the terminal device of this embodiment, which is not described again.

When performing the focusing, the terminal device according to embodiments of the present disclosure firstly obtains two images collected by combination pixels in the second camera assembly, and then determines whether the phase difference between the two images is in the preset range, and controls the first motor to drive the first camera to move according to the phase difference if the phase difference is not in the preset range. In this way, by performing a phase focusing using the second camera assembly including a large area of combination pixels, the accuracy and speed of focusing are improved, the cost of quick focusing is reduced, and quality of the image photographed by the terminal device is improved.

In the specification, it is to be understood that terms such as "left," "right," should be construed to refer to the orientation or the position as then described or as shown in the drawings under discussion. These relative terms are only used to simplify description of the present invention, and do not indicate or imply that the device or element referred to must have a particular orientation, or constructed or operated in a particular orientation. Thus, these terms cannot be constructed to limit the present invention.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. Thus, the appearances of the above phrases throughout this specification are not necessarily referring to the same embodiment or example of the present invention. Furthermore, the particular features, structures, materials, or characteristics may be combined in any suitable manner in one or more embodiments or examples.

Although embodiments of the present invention have been shown and described, it would be appreciated by those skilled in the art that changes, modifications, alternatives and variations can be made in the embodiments without departing from the scope of the present invention. The scope of the present invention is defined by the claims and the like.

What is claimed is:

1. A focusing processing method, applied in a terminal device provided with a first camera assembly for photographing pictures and a second camera assembly for performing a phase focusing, wherein the first camera assembly and the second camera assembly are configured to realize focusing synchronously, each of a plurality of first filter units in the first camera assembly corresponds to one pixel point in a first image sensor, each of a plurality of second filter units in the second camera assembly corresponds to one combination pixel in a second image sensor and each combination pixel corresponds to two spectroscopic lens in the second image sensor, such that in the second image sensor light passes through the second filter unit, the spectroscopic lens and the combination pixel in sequence, and each combination pixel comprises n adjacent pixel points, where n is an even number greater than or equal to 2; the method comprising:

obtaining a first image collected by n/2 pixel points on a left side of a combination pixel in the second image sensor and a second image collected by n/2 pixel points on a right side of the combination pixel in the second image sensor, wherein the combination pixel is divided symmetrically into two parts to acquire the left side and the right side;

determining a phase difference between the first image and the second image and determining whether the phase difference is in a preset range;

controlling a first motor in the first camera assembly to drive a first camera to move according to the phase difference and depending on a preset strategy, when the phase difference is not in the preset range; and obtaining position information of a second camera in the second camera assembly and controlling the first motor to drive the first camera to move to a same position as the second camera according to the position information of the second camera, when the phase difference is in the preset range.

2. The method according to claim 1, after determining a phase difference between the first image and the second image and determining whether the phase difference is in a preset range, further comprising:

controlling a second motor in the second camera assembly to drive a second camera to move according to the phase difference and depending on the preset strategy, when the phase difference is not in the preset range.

3. The method according to claim 1, wherein, the second image sensor comprises m pixel points, where m is an even number far greater than n;

obtaining a first image collected by n/2 pixel points on a left side of a combination pixel in the second image sensor and a second image collected by n/2 pixel points on a right side of the combination pixel in the second image sensor comprises: obtaining m/n groups of images collected by the second image sensor, wherein each group of images comprises the first image collected by n/2 pixel points on a left side of a combination pixel and the second image collected by n/2 pixel points on a right side of the combination pixel; and determining a phase difference between the first image and the second image and determining whether the phase difference is in a preset range comprises: determining a phase difference between the first image and the second image in each group of images, and determining whether the phase difference between the first image and the second image in each group of images is in the preset range.

4. The method according to claim 3, wherein, m is an integral multiple of n.

5. The method according to claim 1, wherein, each of the plurality of second filter units in the second camera assembly corresponds to 2*2 pixel points in the second image sensor.

6. The method according to claim 1, wherein, controlling a first motor in the first camera assembly to drive a first camera to move according to the phase difference and depending on a preset strategy comprises:

determining a target distance and a target direction corresponding to the phase difference by inquiring a preset mapping table between phase differences and control information; and controlling the first motor to drive the first camera to move the target distance in the target direction, according to the target distance and the target direction.

7. The method according to claim 6, wherein, controlling a first motor in the first camera assembly to drive a first camera to move according to the phase difference and depending on a preset strategy comprises:

controlling the first motor in the first camera assembly to drive the first camera to move towards the first image sensor depending on the preset strategy, when the phase difference is lower than the preset range; or controlling the first motor in the first camera assembly to drive the first camera to move away from the first image sensor depending on the preset strategy, when the phase difference is higher than the preset range.

8. The method according to claim 6, before obtaining a first image collected by n/2 pixel points on a left side of a combination pixel in the second image sensor and a second image collected by n/2 pixel points on a right side of the combination pixel in the second image sensor, further comprising:

determining that a third image acquired by the first camera assembly does not meet a focusing requirement.

9. The method according to claim 1, wherein, the preset range is determined according to a phase difference between the first image and the second image obtained by the left side and the right side of the combination pixel when the second image sensor is under a focused state and according to allowable error range.

10. A focusing processing apparatus, applied in a terminal device provided with a first camera assembly for photographing pictures and a second camera assembly for performing a phase focusing, wherein the first camera assembly and the second camera assembly are configured to realize focusing synchronously, each of a plurality of first filter units in the first camera assembly corresponds to one pixel point in a first image sensor, each of a plurality of second filter units in the second camera assembly corresponds to one combination pixel in a second image sensor and each combination pixel corresponds to two spectroscopic lens in the second image sensor, such that in the second image sensor light passes through the second filter unit, the spectroscopic lens and the combination pixel in sequence, and each combination pixel comprises n adjacent pixel points, where n is an even number greater than or equal to 2; the apparatus comprising:

a processor;

a memory, configured to store instructions executable by the processor, wherein the processor is configured to:

obtain a first image collected by n/2 pixel points on a left side of a combination pixel in the second image sensor and a second image collected by n/2 pixel points on a right side of the combination pixel in the second image sensor;

determine a phase difference between the first image and the second image, and determine whether the phase difference is in a preset range;

control a first motor in the first camera assembly to drive a first camera to move according to the phase difference and depending on a preset strategy, when the phase difference is not in the preset range; and obtain position information of a second camera in the second camera assembly and control the first motor to drive the first camera to move to a same position as the second camera according to the position information of the second camera, when the phase difference is in the preset range.

11. The apparatus according to claim 10, wherein, the processor is further configured to:

control a second motor in the second camera assembly to drive a second camera to move according to the phase difference and depending on the preset strategy, when the phase difference is not in the preset range.

12. The apparatus according to claim 10, wherein, the second image sensor comprises m pixel points, where m is an even number far greater than n;

the processor is configured to obtain a first image collected by n/2 pixel points on a left side of a combination pixel in the second image sensor and a second image collected by n/2 pixel points on a right side of the combination pixel in the second image sensor by obtaining m/n groups of images collected by the second image sensor, wherein each group of images comprises the first image collected by n/2 pixel points on a left side of a combination pixel and the second image collected by n/2 pixel points on a right side of the combination pixel; and the processor is configured to determine a phase difference between the first image and the second image and determine whether the phase difference is in a preset range by determining a phase difference between the first image and the second image in each group of images, and determining whether the phase difference between the first image and the second image in each group of images is in the preset range.

13. The method according to claim 12, wherein, m is an integral multiple of n.

14. The apparatus according to claim 10, wherein, each of the plurality of second filter units in the second camera assembly corresponds to 2*2 pixel points in the second image sensor.

15. The apparatus according to claim 10, wherein, the processor is configured to control a first motor in the first camera assembly to drive a first camera to move according to the phase difference and depending on a preset strategy by acts of:
  determining a target distance and a target direction corresponding to the phase difference by inquiring a preset mapping table between phase differences and control information; and
  controlling the first motor to drive the first camera to move the target distance in the target direction, according to the target distance and the target direction.

16. The apparatus according to claim 14, wherein, the processor is configured to control a first motor in the first camera assembly to drive a first camera to move according to the phase difference and depending on a preset strategy by acts of:
  controlling the first motor in the first camera assembly to drive the first camera to move towards the first image sensor depending on the preset strategy, when the phase difference is lower than the preset range; or
  controlling the first motor in the first camera assembly to drive the first camera to move away from the first image sensor depending on the preset strategy, when the phase difference is higher than the preset range.

17. The apparatus according to claim 14, wherein, the processor is further configured to:
  determine that a third image acquired by the first camera assembly does not meet a focusing requirement.

18. A terminal device, comprising a shell, a processor, a memory, a circuit board, a power supply circuit, a first camera assembly for photographing pictures and a second camera assembly for performing a phase focusing, wherein the first camera assembly and the second camera assembly can realize focusing synchronously, each of a plurality of first filter units in the first camera assembly corresponds to one pixel point in a first image sensor, each of a plurality of second filter units in the second camera assembly corresponds to one combination pixel in a second image sensor and each combination pixel corresponds to two spectroscopic lens in the second image sensor, such that in the second image sensor light passes through the second filter unit, the spectroscopic lens and the combination pixel in sequence, each combination pixel comprises n adjacent pixel points, where n is an even number greater than or equal to 2; the circuit board is located in a space formed by the shell, the processor and the memory are arranged on the circuit board; the power supply circuit is configured to supply power for respective circuits or components in the terminal device; the memory is configured to store executable program codes; the processor is configured to execute a program corresponding to the executable program codes by reading the executable program codes stored in the memory so as to perform following acts of:
  obtaining a first image collected by n/2 pixel points on a left side of a combination pixel in the second image sensor and a second image collected by n/2 pixel points on a right side of the combination pixel in the second image sensor;
  determining a phase difference between the first image and the second image and determining whether the phase difference is in a preset range;
  controlling a first motor in the first camera assembly to drive a first camera to move according to the phase difference and depending on a preset strategy, when the phase difference is not in the preset range; and
  obtaining position information of a second camera in the second camera assembly and controlling the first motor to drive the first camera to move to a same position as the second camera according to the position information of the second camera, when the phase difference is in the preset range.

* * * * *